United States Patent [19]

Greenwood

[11] Patent Number: 4,652,062
[45] Date of Patent: Mar. 24, 1987

[54] CART PARTICULARLY DESIGNED FOR RESPONDING TO EMERGENCIES

[76] Inventor: Sidney Greenwood, 15516 Sunset Blvd., Pacific Palisades, Calif. 90272

[21] Appl. No.: 838,169

[22] Filed: Mar. 10, 1986

Related U.S. Application Data

[63] Continuation-in-part of Ser. No. 956,675, Jan. 28, 1985, abandoned.

[51] Int. Cl.[4] ............................................. A47B 91/00
[52] U.S. Cl. .................................... 312/209; 312/250; 280/47.35
[58] Field of Search ...................... 312/250, 209, 249; 248/129; 280/47.19, 47.34, 47.35

[56] References Cited

U.S. PATENT DOCUMENTS

| | | | | |
|---|---|---|---|---|
| D. 153,654 | 5/1949 | Wende | ............................. | 280/47.35 |
| 2,682,932 | 7/1954 | Howard | ............................. | 312/209 |
| 2,784,999 | 3/1957 | Hunt | ............................. | 280/47.35 |
| 3,984,162 | 10/1976 | Zozzaro | ............................. | 312/250 |
| 4,518,208 | 5/1985 | Marder | ............................. | 312/250 |

FOREIGN PATENT DOCUMENTS 239250 11/1960 Australia .................... 280/47.35

Primary Examiner—Kenneth J. Dorner
Assistant Examiner—Gerald A. Anderson

[57] ABSTRACT

A wheeled vehicle for carrying and storing tools and materials, particularly needed for responding to a casualty, especially spillage of hazardous material. The vehicle has a base platform having pairs of wheels, at least one pair of which are castor wheels. The cabinet has hinged doors opening laterally. The platform has a hand grip at one end of the cabinet at the top to facilitate maneuvering of the vehicle over obstacles. The wheels are spaced from the ends of the platform and are within the confines of the front and back of the platform and the cabinet. The ends of the platform may be extended for carrying equipment outside of the cabinet.

1 Claim, 7 Drawing Figures

CART PARTICULARLY DESIGNED FOR RESPONDING TO EMERGENCIES

This application is a continuation-part of Ser. No. 06/956,675, filed on Jan. 28, 1985, now abandon.

BACKGROUND OF THE INVENTION

1. Field of the Invention

The field of the invention is that of wheeled vehicles or carts which are readily maneuverable in confined spaces and which are particularly designed for carrying appropriate tools, materials and equipment for quick response to dangers arising from spills or hazardous materials, for example, or other emergencies.

2. Description of the Prior Art

A related type of product or equipment is that disclosed in U.S. Pat. No. 2,981,549 which relates to a cart identified as a mobile tool stand.

In the industrial world today, many types of dangerous and hazardous materials, particularly chemical materials, are handled in connection with research, manufacturing and processing of products. Many of these hazardous materials are well-known chemical materials, or on the other hand, some of them are more or less exotic chemical materials. Spills of such materials can give rise to very dangerous conditions and hazards. The type of spaces in which these dangers are apt to be encountered typically are in more or less confined areas, that is, building structures having narrow corridors or passageways connecting research and development laboratories and comparable areas where there is a need to have the capability to bring to the area or scene of the hazard needed tools, equipment and/or supplies which are necessary to contain or alleviate the dangerous conditions. As stated, the spills referred to of hazardous chemicals and other substances may take place in laboratory areas, cleaning shops, analytical laboratories and other comparable locales. Such spills, as are referred to, may be spills of various dangerous substances, such as mercury, hydrofluoric acid, acetone, sulfuric acid, etc. Quick response to such casualties, of course, requires quickly bringing to the scene of the casualty appropriate tools, materials and equipment usable to alleviate and/or contain the hazards involved.

Rapid response to other types of casualties are equally necessary, such as responses to fires, medical emergencies, etc.

Illustratively, the various items that may be imperatively necessary at the scene of the casualty, such as a spill casualty, for example, on the other hand, will contribute to alleviating or containing the casualty may include such things as absorbent blankets, mercury absorbent, absorbents for other chemicals, safety gloves, splash suits and overshoes, squeegees, barricade tape, pH paper, spill-control pillows, mercury sponges, protective coveralls, hose appliances, tongs, floor-stand signs, etc.

There has been a need in the art which has not been adequately met for a cart or transportation vehicle adapted to carrying in an organized way materials and equipment of the type referred to and which can be readily moved or gotten into the hazardous areas quickly. As pointed out, it may be necessary to move such a vehicle through confined spaces having narrow corridors or otherwise being restricted. A product, that is, a corridor vehicle, highly adapted to accomplishment of these purposes, of course, requires very particular characteristics from the standpoint of its capability of being moved, its maneuverability, and its capability to hold and contain all of the appropriate items in an organized way.

The herein invention provides a cart or wheeled vehicle, as described in detail hereinafter, which provides all the necessary capabilities to be able to meet the needs associated with casualties of the types that have been identified.

SUMMARY OF THE INVENTION

Preferred forms of the invention are disclosed in detail hereinafter.

In preferred forms, the invention comprises a platform having two pairs of wheels and carrying a cabinet for containing articles that may be needed in response to a casualty. The platform and the cabinet are relatively narrow as compared to their length to accommodate usage in narrow corridors. The platform wheels are spaced inwardly from the ends of the platform and are laterally within the confines of the cabinet and the platform to conform with the purpose of having a relatively narrow unit for use in comfined spaces.

A second cabinet or housing is provided on top of the cabinet referred to above for transporting additional articles.

In one form of the cart, the platform is elongated, extending beyond the confines of the cabinet at both ends for transporting equipment not adapted to be carried in the cabinet. In one form of the invention, the end part of the platform extends out farther at one end than the other. The secondary cabinet on top of the first-mentioned cabinet may be in the form of a housing for transporting elongated equipment which extends out over that end of the platform that extends out further. A handle is provided at one end of the cart which extends outwardly beyond the end of the platform to provide for easy maneuverability of the cart over obstacles.

In light of the foregoing, the primary object of the invention is to make available a wheeled vehicle in the form of a cart constructed for carrying articles which may be needed for purposes of responding to a casualty, the cart having a particular construction and being relatively narrow relative to its width so as to accommodate it to being maneuverable in constricted areas, including narrow corridors.

A further object is to make available a cart as in the foregoing wherein the wheels are spaced from the ends of the supporting platform and laterally are within the confines of the platform and the cabinet, the cart in one form having a platform which extends beyond the ends of the cabinet to provide space for transporting articles not adapted for transportation within the cabinet.

Further objects and additional advantages of the invention will become apparent from the following detailed description and annexed drawings.

DESCRIPTION OF A PREFERRED FORM OF THE INVENTION AND BEST MODE OF PRACTICE OF THE INVENTION

Figure 1:
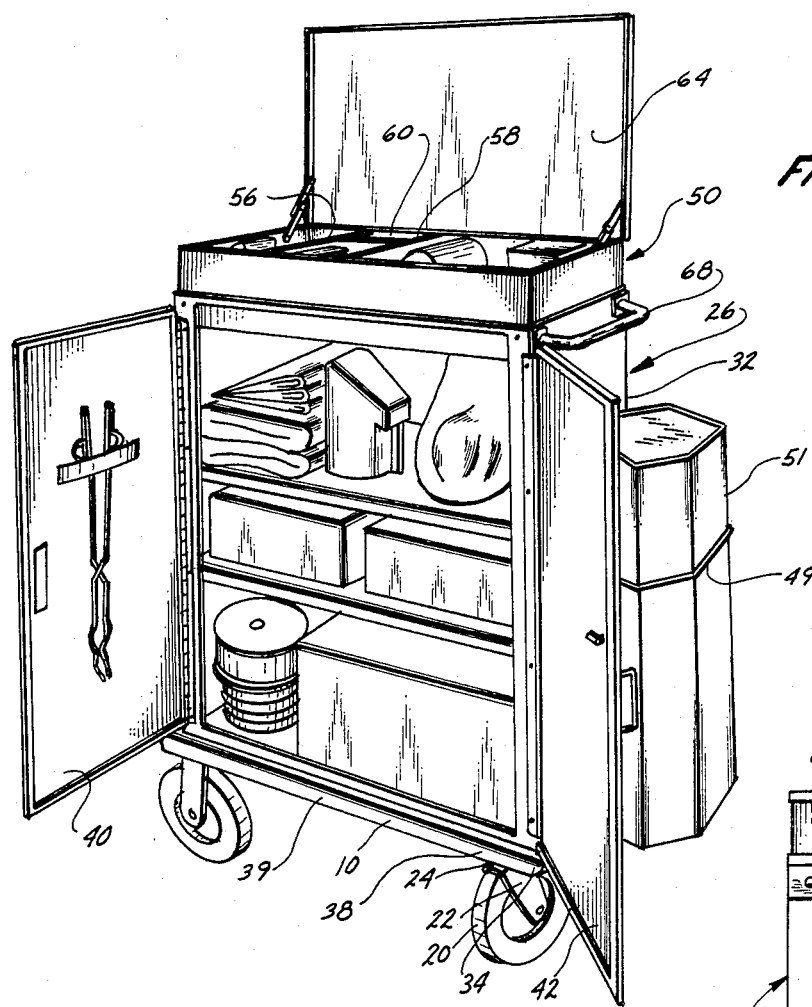
FIG. 1 is an isometric view of a preferred form of the invention.
Figure 3:
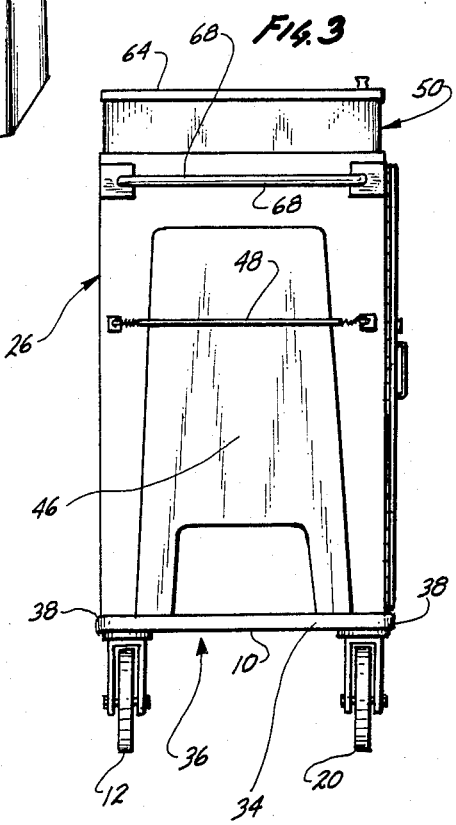
FIG. 3 is an end view of the cart of FIG. 1.

Referring to FIG. 1 of the drawings, numeral 10 designates a base of the cart which is in the form of a flat plaform. The cart has a pair of wheels at one end and a pair of wheels at the other end. The wheels at one end are identified by the numerals 12 and 14 in FIG. 2, the wheels being supported by supports extending downward from the bottom of the platform 10.

The wheels at the other end are castor wheels. One of these wheels is designated at 20 in FIG. 1. The axle of the wheel 20 is carried by a swiveling support member, one of which is shown at 22, which extends from a swiveling base 24. Preferably, the wheels are provided with tires made from a special non-marking, non-degradable type of urethane that will not break down if exposed to corrosive materials.

The wheels are within the front and back edges of platform 10 and spaced inwardly from its ends.

Carried on flat platform 10 is the cabinet 26 which preferably may be constructed of steel or in some cases stainless steel depending upon the particular environment in which the cart is to be used. The cabinet itself is rectilinear having ends 28 and 30 and a back 32. The front of the cabinet is open and provided with doors, the cabinet having shelves within it for support of the various tools and equipment items that may be needed. See FIG. 1. The platform 10 and the cabinet 26 are relatively long with respect to the width. Preferably, the length may be two or three times the width so as to adapt and accommodate the cart for usage in corridors that may be relatively narrow and otherwise restricted spaces. Thus, the size and one pair of wheels being castor wheels make the cart maneuverable as necessary so that it can be readily moved in the narrow corridors and/or restricted spaces. Also promoting maneuverability and adaptability to use in restricted spaces are bumpers 33, 34 at the respective longitudinal ends 35, 36 of the platform 10. Ends 35, 36 each include oppositely disposed arcuate sections 37, 38, respectively, between the said ends and the lateral edge portions 39 of the platform 10. Bumpers 33, 34 comprise strips of resilient materials, such as rubber or the like, disposed upon the ends 35, 36, including the arcuate sections 37, 38 thereof. The bumpers 34, 35 and the partially arcuate configuration of the longitudinal ends of the platform 10 promote maneuverability of the cart since thereby the tendency for the edges of the platform to catch or snag relative to walls or other surrounding structures or equipment is minimized with respect to a configuration with sharp corners. In addition, the bumpers facilitate mobility since they prevent collision between the cart and its surroundings from causing the cart to "stick" and tend to return it to the path in which it was being propelled prior to a collision or contact with surrounding structures or equipment.

There are two doors that close the front of the cabinet as identified at 40 and 42. The doors are hinged about vertical axes so as to open outwardly, that is, laterally, with respect to the cart. Thus, even in a restricted space or corridor, the cart can be moved close to one of the walls, and this allows opening of the two doors providing full exposure or access to the interior cabinet and the items supported on the shelves in it. A sliding doors or doors can also be employed in accordance with the invention. A lock is provided as designated at 44 so as to insure that the cabinet can be locked so as to preserve the security of the items stored therein.

Figure 2:
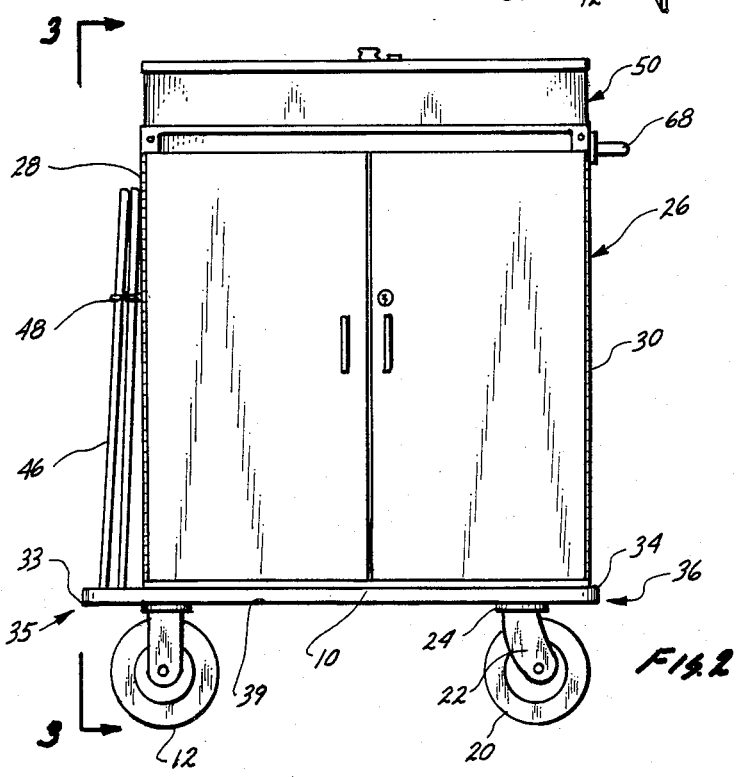
FIG. 2 is a front view of a preferred form of the invention.

Preferably, the platform 10 in FIG. 2 extends outwardly from the end or ends of the cabinet 26 as shown so that additional items can be carried at the end of the platform outside of the cabinet. FIG. 2 shows elongated items as designated at 46 carried on the left-hand end of the platform on the outside of the cabinet and held in position by a bungee retainer 48. Similarly, a bunjee retainer 49 at the right-hand end of the cart holds a container as, for example, a cannister 51 of medical supplies.

Carried on top of the cabinet 26 or alternatively made a part of the cabinet is a rectilinear cabinet or container 50 as illustrated isometrically in FIG. 1. This container has substantially the same length and width dimensions as the cabinet 26. It has internal partitions shown at 56, 58 and 60 providing rectangular compartments of a size adapted for holding and storing particular items of equipment of sizes which fit snugly into the compartments.

The container or cabinet 50 has a hinged cover 64 which is hinged to one of the longer top edges of the container 50. The cover 64 opens laterally away from the front of the cabinet so as to be able to expose readily and quickly all of the contents of the container 50.

By opening laterally away from the front of the cabinet 26, the cover or lid 64 does not provide an obstruction with respect to the cabinet 26 or access to the container 50.

Numeral 68 designates a handle bar at one end of the cart whereby it can be conveniently manually moved in either direction. The wheels below the platform 10 are of size relative to the size of the cabinet and the weight that would be carried therein so that the cart can readily be moved over obstructions of limited height. This can be facilitated by handle 68.

Figure 4:
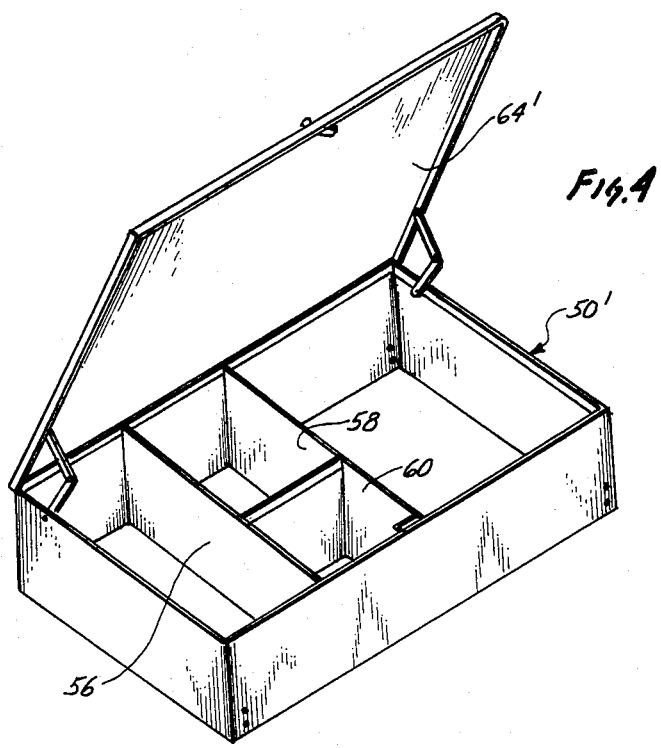
FIG. 4 is an isometric view of a top compartment in a modified form of the invention.
Figure 6:
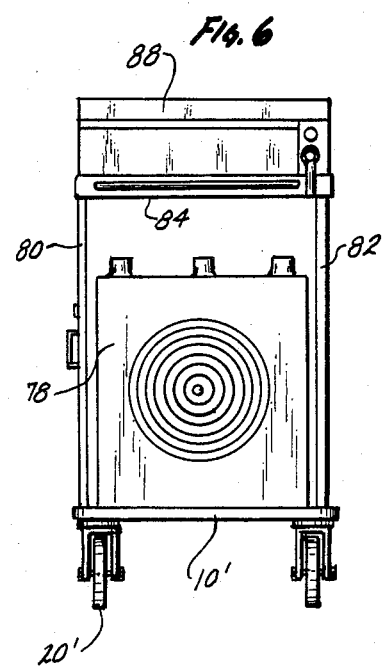
FIG. 6 is an end view of the form of the invention of FIG. 5.
Figure 5:
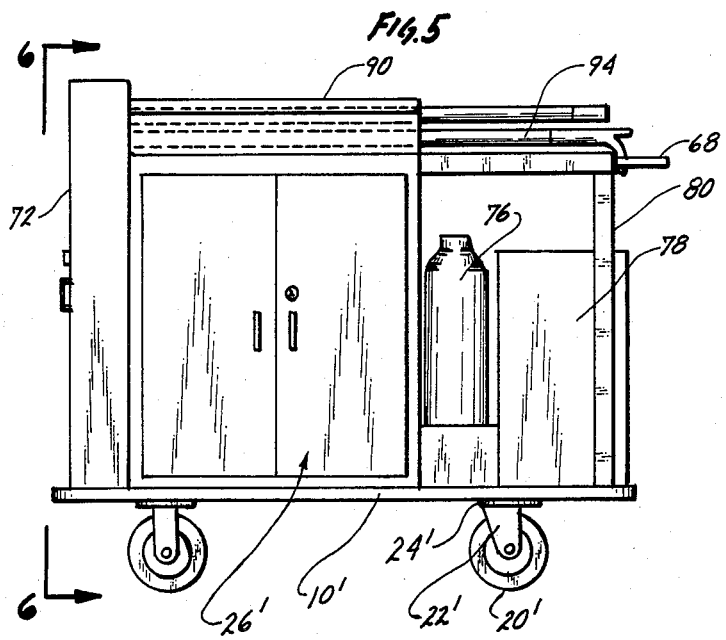
FIG. 5 is a front view of a modified form of the invention.
Figure 7:
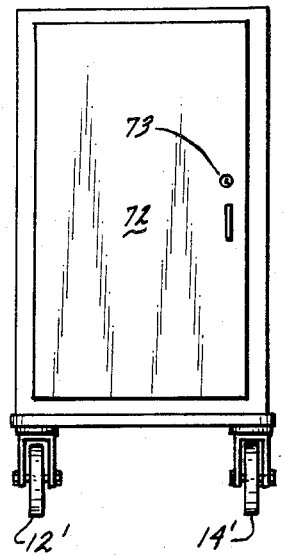
FIG. 7 is an end view of the opposite end of the form of the invention of FIG. 5.

FIGS. 4, 5 and 7 show a modified form of the invention. In these figures, reference numerals that identify parts that are the same as in the previous embodiment or are closely similar are identified by the same reference numerals primed. In this form of the invention, the platform 10' is slightly longer than in the previous embodiment with end parts that extend forwardly and rearwardly from the wheel assemblies, the platform being somewhat longer than the cabinet 26'. In this form of the invention, the cabinet 26' is like that of the previous form of the invention but shorter relative to platform 10'. Supported on the platform 10' at one end adjacent to the cabinet 26 is a fire hose cabinet having a hinged door 72 provided with a lock 73. It has a relative width and height as illustrated by way of example in FIGS. 5 and 7.

Carried on the platform 10' adjacent to the cabinet 26 is an air bottle 76. Carried on the platform 10' adjacent to the air bottle is a smoke ejector 78. The equipment or components 76 and 78 are standard commercial products and are of a size to be accommodated in the manner shown on the platform 10'. They are shown by way of example in a fire response cart.

In this form of the invention, at one end of the platform are a pair of uprights 80 and 82, the smoke ejector 78 being in a position between them.

Numeral 84 designates a frame member extending between the uprights 80 and 82 and over the items 76 and 78.

Numeral 88 designates a top member, and below this member and over the top of the cabinet 26 is a compartment or housing 90 of a size that it can accommodate elongated pieces of equipment, such as the ceiling probes or pike poles as identified by the numeral 94.

From the foregoing, those skilled in the art will readily observe that both forms of the invention as described in detail embody the necessary characteristics whereby to be capable of realizing all of the objectives as set forth in the foregoing. The cart or vehicle, because of its relative dimensions, accommodates itself to readily be used in narrow corridors or otherwise restricted spaces. The size and positioning of the two doors closing the compartment are adapted to ready use in such restricted environments, it being possible to open the doors fully exposing the entire interior of the cabinet so that quick and easy removal of the contents can be realized. The container or housing on top of the cabinet accommodates itself readily to its purpose of providing ready access to components which can be carried therein, including elongated items, such as those shown in FIG. 4. The embodiment of FIGS. 4–7 include provision for additional pieces of equipment that may be necessary, including the fire hose, air bottle and smoke ejector.

The foregoing is representative of preferred forms of the invention and is to be interpreted in an illustrative rather than a limiting sense, the invention to be accorded the full scope of the claims appended hereto.

What is claimed is:

1. As an article of manufacture, a vehicle for carrying and storing tools and materials as may be needed for responding to an emergency, the vehicle including a platform carrying a cabinet, the cabinet being relatively narrow, the width of the cabinet being substantially less than the length of the cabinet to accommodate it to narrow corridors, the cabinet having a front and a back, the cabinet having a front opening and having a plurality of shelves in the cabinet, the platform having a width substantially the same as the width of the cabinet, the ends of the platform extending beyond the ends of the cabinet, one end of the platform extending farther from the end of the cabinet than the other end of the platform to provide space for transporting relatively large equipment, the platform having two pairs of wheels spaced inwardly of the front and back of the cabinet and platform and spaced from the ends of the said platform, the cabinet having a handle adjacent the top of one end of the cabinet, the handle extending outwardly beyond the end of the platform at that end of the platform, the cabinet having a top compartment having substantially the same length and width as the said cabinet and having an opening, the said one extending end of the platform being constructed for transporting equipment, the compartment on top of the cabinet being in the form of a housing constructed to hold relatively long implements, long enough to extend out over the end of the platform another cabinet carried on the other extending end of the platform, said other cabinet being substantially rectangular, said other cabinet having a width substantially equal to the width of the platform and having a door opening outwardly from the first cabinet.

* * * * *